(12) United States Patent
Fountain et al.

(10) Patent No.: US 8,170,742 B2
(45) Date of Patent: May 1, 2012

(54) ANTILOCK BRAKING SYSTEM DIAGNOSTIC TOOL AND METHOD

(75) Inventors: Gregory J. Fountain, Kalamazoo, MI (US); Randy L. Mayes, Otsego, MI (US); Michael P. Tabbey, Fennville, MI (US)

(73) Assignee: SPX Corporation, Charlotte, NC (US)

( * ) Notice: Subject to any disclaimer, the term of this patent is extended or adjusted under 35 U.S.C. 154(b) by 665 days.

(21) Appl. No.: 12/266,612

(22) Filed: Nov. 7, 2008

(65) Prior Publication Data

US 2010/0121519 A1     May 13, 2010

(51) Int. Cl.
*G01M 17/00* (2006.01)

(52) U.S. Cl. ............... 701/34.4; 701/29.2; 701/31.4; 701/33.2

(58) Field of Classification Search ........... 701/29–35; 340/453, 461

See application file for complete search history.

(56) References Cited

U.S. PATENT DOCUMENTS

| | | | |
|---|---|---|---|
| 6,097,998 A * | 8/2000 | Lancki | 701/33 |
| 6,114,952 A * | 9/2000 | Francesangeli et al. | 340/453 |
| 6,369,581 B1 * | 4/2002 | Ota et al. | 324/537 |
| 6,747,552 B2 * | 6/2004 | Sparacino et al. | 340/438 |
| 7,209,815 B2 * | 4/2007 | Grier et al. | 701/29 |
| 7,706,936 B2 * | 4/2010 | Krzystofczyk et al. | 701/29 |
| 2004/0090114 A1 * | 5/2004 | Macnamara et al. | 303/118.1 |
| 2005/0010341 A1 * | 1/2005 | MacNamara et al. | 701/33 |
| 2006/0095230 A1 * | 5/2006 | Grier et al. | 702/183 |
| 2006/0136104 A1 * | 6/2006 | Brozovich et al. | 701/29 |
| 2007/0100520 A1 * | 5/2007 | Shah et al. | 701/33 |

* cited by examiner

Primary Examiner — Paul N Dickson
Assistant Examiner — Timothy Wilhelm
(74) Attorney, Agent, or Firm — Baker & Hostetler LLP

(57) ABSTRACT

A method of diagnosing, installing, repairing and/or maintaining an antilock braking system (ABS) unit in a motorcycle. The method includes connecting a diagnostic tool to an ABS unit of a motorcycle, communicating with the ABS unit using the diagnostic tool and informing a mechanic utilizing the diagnostic tool about a component in the ABS unit. Also, a tool for diagnosing, installing, repairing and/or maintaining an antilock braking system (ABS) unit in a motorcycle.

19 Claims, 4 Drawing Sheets

ANTILOCK BRAKING SYSTEM DIAGNOSTIC TOOL AND METHOD

FIELD OF THE INVENTION

The present invention relates generally to diagnostic tools and methods. More particularly, the present invention relates to devices, systems, components and methods that are configured to diagnose braking systems and/or components thereof.

BACKGROUND OF THE INVENTION

Antilock braking system (ABS) units were first developed for aircrafts in the late 1920s and have been commonplace in automobiles since the 1970s. However, ABS units have only begun to become widely available in motorcycles, either as standard equipment or as an available option, during the $21^{st}$ century. As such, a significant percentage of current motorcycle mechanics are relatively unfamiliar with the installation, repair and/or maintenance of ABS units.

Hence, the likelihood of a motorcycle mechanic improperly assembling, diagnosing and/or repairing a motorcycle's ABS unit is relatively high. For example, due to lack of experience, a motorcycle mechanic may inadvertently install an incompatible component in an ABS unit or may incorrectly orient one or more components in the ABS unit.

SUMMARY OF THE INVENTION

At least in view of the above, it would be desirable to provide novel diagnostic tools that assist a motorcycle mechanic while the mechanic is assembling, diagnosing and/or repairing a motorcycle's ABS unit. It would also be desirable to provide methods of performing such assembly, repair and/or maintenance wherein the mechanic is assisted by a diagnostic tool.

The foregoing needs are met, to a great extent, by certain embodiments of the present invention. According to one such embodiment of the present invention, a method of diagnosing an antilock braking system (ABS) unit is provided. The method includes connecting a diagnostic tool to an ABS unit of a motorcycle. The method also includes communicating with the ABS unit using the diagnostic tool. In addition, the method further includes informing a mechanic utilizing the diagnostic tool about a component in the ABS unit.

In accordance with another embodiment of the present invention, a diagnostic tool is provided. The diagnostic tool includes an interface configured to be connected to an antilock braking system (ABS) unit of a motorcycle. The diagnostic tool also includes circuitry connected to the interface and configured to diagnose the ABS unit. In addition, the diagnostic tool also includes a user interface connected to the circuitry and configured to inform a user about a component in the ABS unit.

In accordance with yet another embodiment of the present invention, another diagnostic tool is provided. The diagnostic tool includes means for connecting the diagnostic tool to an anti-lock braking system (ABS) unit of a motorcycle. The diagnostic tool also includes means for communicating with the ABS unit using the diagnostic tool. In addition, the diagnostic tool also includes means for informing a mechanic utilizing the diagnostic tool about a component in the ABS unit.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
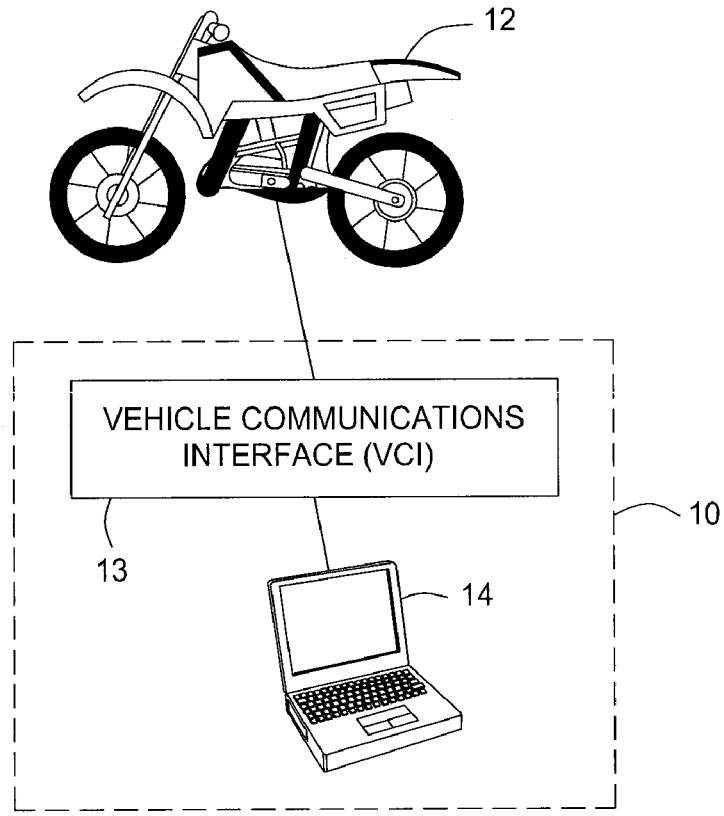
FIG. 1 illustrates a diagnostic tool according to an embodiment of the present invention as the tool is connected to a motorcycle.
Figure 2:
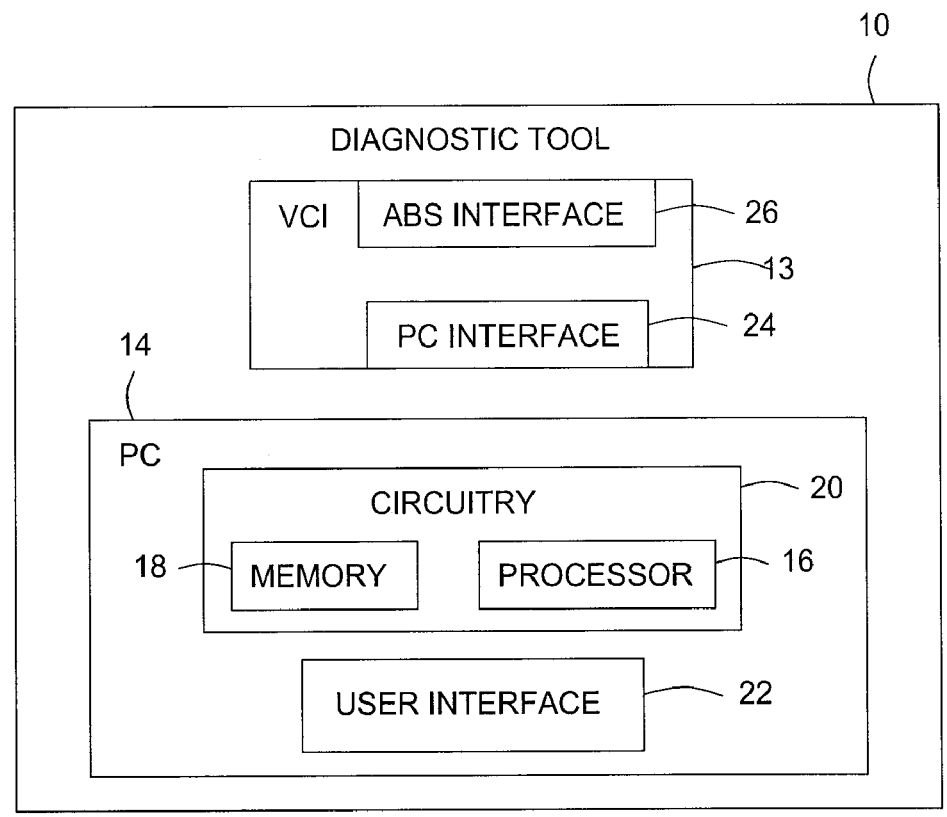
FIG. 2 illustrates a schematic representation of components included in the diagnostic tool illustrated in FIG. 1.

The invention will now be described with reference to the drawing figures, in which like reference numerals refer to like parts throughout. FIG. 1 illustrates a diagnostic tool 10 according to an embodiment of the present invention where the diagnostic tool 10 is connected to a motorcycle 12. The diagnostic tool 10 includes a vehicle communications interface (VCI) 13 and a personal computer 14 (which may be any device having computing capability). As illustrated in FIG. 1, the diagnostic tool 10 is connected to the motorcycle 12 via the VCI 13. FIG. 2 illustrates a schematic representation of components included in the diagnostic tool 10 illustrated in FIG. 1.

The diagnostic tool 10 illustrated in FIG. 1 is connected to the antilock braking system (ABS) unit of the motorcycle 12 via the VCI 13. According to certain embodiments of the present invention, the VCI 13 of the diagnostic tool 10 is connected to the ABS unit of the motorcycle 12 via a J1850 connector. However, the use of other connectors between the VCI 13 and the ABS unit of the motorcycle 12 is also within the scope of the present invention. Also, any connector that allows for communication between the VCI 13 and the computer 14 included in the diagnostic tool 10 may be used. In addition, according to certain embodiments of the present invention, wireless connections between the ABS unit of the motorcycle 12, the VCI 13 and/or the computer 14 are used.

As illustrated in FIG. 2, the PC component 14 of the diagnostic tool 10 includes a piece of circuitry 20. This piece of circuitry is typically configured to diagnose the ABS unit of the motorcycle 12. In turn, the circuitry 20 illustrated in FIG. 2 includes a processor 16 and a memory device 18 that provide computing and memory/storage capacity, respectively. The diagnostic tool 10 also includes a user interface 22 (located in the PC 14), a PC interface 24 (located in the VCI 13) and an ABS unit interface 26 (also located in the VCI 13), all of which are operably connected to each other and to the circuitry 20.

According to certain embodiments of the present invention, the user interface 22 includes a screen capable of displaying text and/or images that are visible to a motorcycle mechanic while the mechanic is installing, diagnosing and/or repairing the ABS unit of the above-mentioned motorcycle 12. The user interface 22, according to certain embodiments of the present invention, also includes buttons, a touch screen and/or other components that allow a user of the diagnostic tool 10 (e.g., the above-mentioned mechanic) to input information into the diagnostic tool 10.

In certain embodiments of the present invention, the VCI 13 is sophisticated and, as such, includes powerful computing capability and/or a relatively large amount of memory and/or a sophisticated user interface. In such embodiments, connecting the VCI 13 to the computer 14 illustrated in FIG. 1 is not needed and a separated computer 14 is not included in the diagnostic tool 10 since the computer 14 is effectively incorporated within the VCI 13. However, even in these embodiments, the diagnostic tool 10 may be connected to an external computer when a mechanic wishes to display information on a larger screen and/or wishes to have access to additional computing capacity, additional memory and/or more ergonomic user input devices (e.g., a keyboard, a mouse, etc.).

As will be discussed below, according to certain embodiments of the present invention, the user interface 22 is configured to instruct the user of the diagnostic tool 10 (e.g., a motorcycle mechanic) concerning how to carry out a diagnostic test or other procedure. For example, according to certain embodiments of the present invention, the user interface 22 takes the form of a display screen wherein text (e.g., instructions) and/or illustrations (e.g., flowcharts or illustrations of portions of a motorcycle) may be displayed to assist a mechanic in performing an installation, repair or maintenance procedure.

As will also be discussed below, according to certain embodiments of the present invention, the circuitry 20 illustrated in FIG. 2 is configured to prevent the ABS unit from operating when a diagnostic test carried out using the diagnostic tool 10 is interrupted. For example, if a mechanic is unexpectedly called away while performing a diagnostic procedure (e.g., if the mechanic receives an unexpected phone call), the circuitry 20 is capable of preventing the ABS unit from operating until the mechanic returns or the procedure is completed by another mechanic. According to other embodiments of the present invention, the circuitry 20 is configured to prevent the ABS unit from operating when a diagnostic test carried out using the diagnostic tool 10 fails (i.e., when a component of the ABS unit is either malfunctioning or has been improperly installed).

If the circuitry 20 did not have the above-discussed capability of disabling the ABS unit pursuant to an incomplete or failed diagnostic test, a person riding the services motorcycle could otherwise be injured. Of course, according to certain embodiments of the present invention, the shutdown of the ABS unit is accompanied by a warning light being turned on, typically in the dashboard of the motorcycle, to indicate to the rider that there is a problem with the ABS unit and that riding the motorcycle may not be safe.

In addition to the above functions, the user interface 22 is typically also further configured to request feedback from the user (i.e., the mechanic). For example, the user (i.e., the mechanic) may be asked to input information about the responsiveness of certain components of the ABS unit (e.g., whether the brake lever is offering sufficient resistance when squeezed). This feedback, according to certain embodiments of the present invention, is input using buttons, a touch screen, etc. that are included in the user interface 22.

Figure 3A:
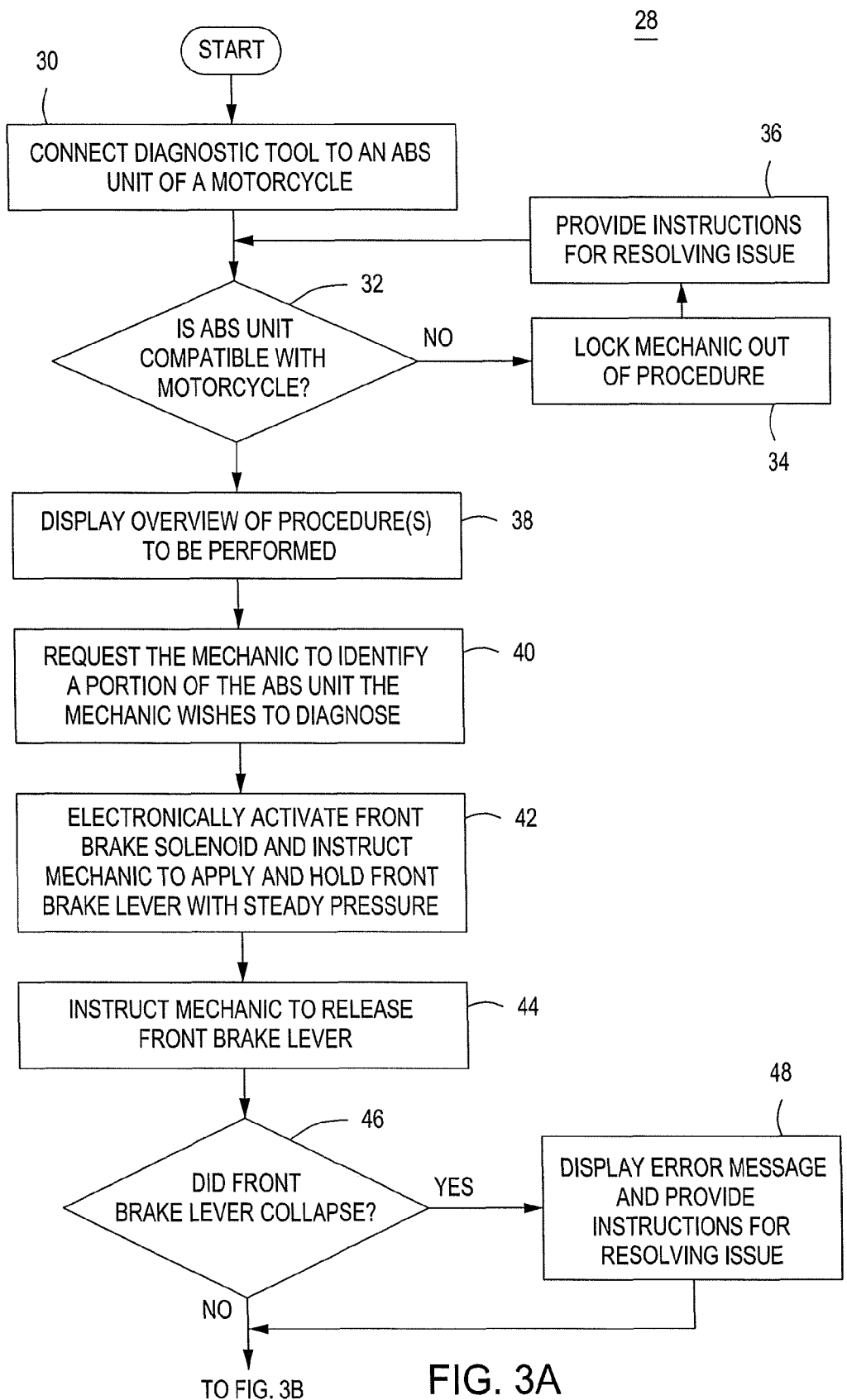
FIG. 3 is a flowchart illustrating steps of a method of diagnosing an anti-lock braking system (ABS) unit according to an embodiment of the present invention.
Figure 3B:
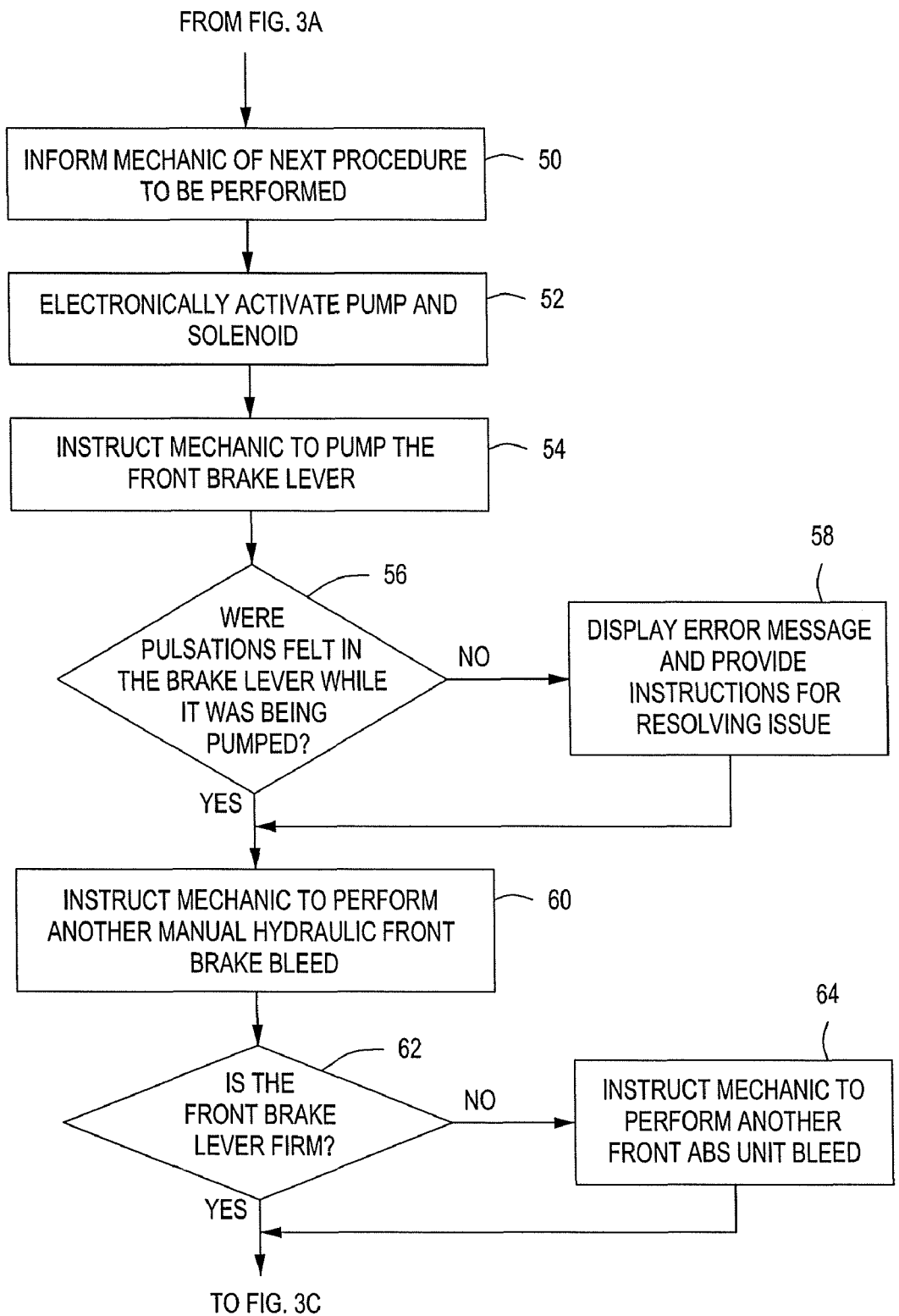
Figure 3C:
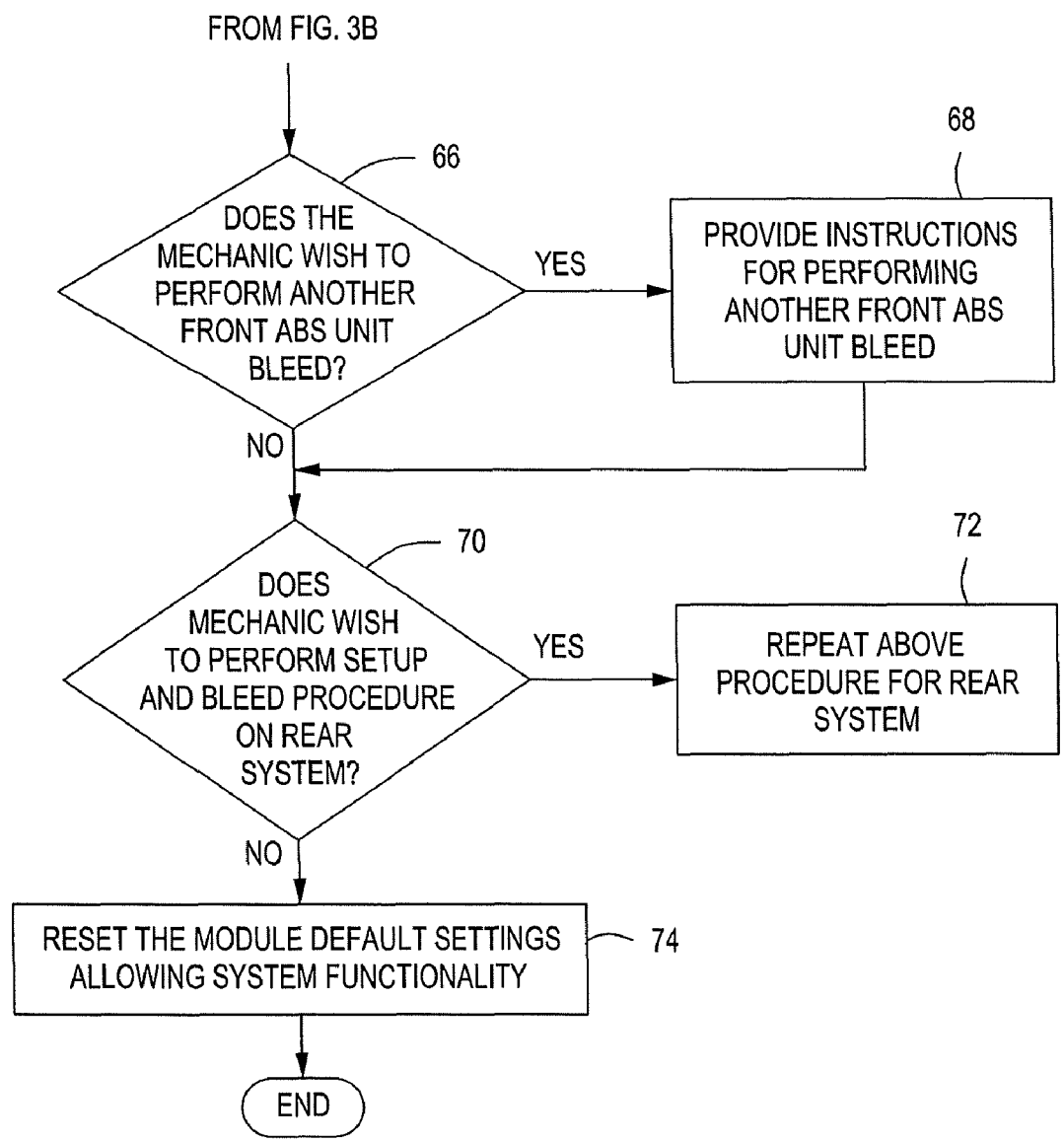

FIG. 3 is a flowchart 28 illustrating steps of a method of diagnosing an anti-lock braking system (ABS) unit according to an embodiment of the present invention. According to certain embodiments of the present invention the steps illustrated in the flowchart 28 are implemented using the diagnostic tool 10 illustrated in FIGS. 1 and 2. However, implementing the steps of the flowchart 28 in other manners is also within the scope of the present invention.

As illustrated in FIG. 3, step 30 of the flowchart 28 specifies connecting a diagnostic tool (e.g., diagnostic tool 10 discussed above) to an ABS unit of a motorcycle. Step 30 may be implemented, for example, by connecting one end of a J1850 cable to the ABS interface 26 illustrated in FIG. 2 and the other end thereof to the interface of the ABS unit of the motorcycle 12 illustrated in FIG. 1.

Step 32 then specifies communicating with the ABS unit using the diagnostic tool. More specifically, step 32 specifies determining whether the ABS unit to which the diagnostic tool is connected is compatible with the motorcycle to be diagnosed or repaired. Step 32 may be implemented, for example, by obtaining identifying information (e.g., a code) from an electronic control module (ECM) of the motorcycle and comparing that identifying information to identification information obtained from the ABS unit.

According to step 34, if there is an incompatibility between the ABS unit and the motorcycle, the mechanic is locked out and is therefore unable to continue the diagnostic procedure. Rather, as specified in step 36, the mechanic is provided with instructions for resolving the issue. For example, the mechanic may be instructed to replace the ABS unit and a list of compatible ABS units may be displayed on the user interface 22 of the diagnostic tool 10.

Once the ABS unit and the motorcycle are found to be compatible with each other, step 38 specifies displaying an overview of the procedure or procedures that are to be performed. For example, the user interface 22 illustrated in FIG. 2 or the screen of the computer 14 illustrated in FIG. 1 may display text that informs the mechanic that, "The ABS Setup and Bleed Procedure energizes the ABS pump motor and solenoids, checks the hydraulic lines for correct connections and verifies the ECM part number." Also, the text may state that, "This process will circulate any air that may be trapped in the ABS unit to allow it to be purged."

Step 40 specifies requesting the mechanic to identify a portion of the ABS unit that the mechanic wishes to diagnose. In response to this request, the mechanic may, for example, input that the front portion of the ABS unit (i.e., the front brake) or that the rear portion of the ABS unit (i.e., the rear brake) is to be tested. The mechanic may identify the portion by pushing a button included in the user interface 22, touching a picture of the portion on a touch screen in the user interface 22, depressing one or more keys on the keyboard of the computer 14, etc.

In instances where the front portion of the ABS unit is identified, step 42 specifies electronically activating the front brake solenoid and instructing the mechanic to apply and hold the front brake lever with steady pressure. Then, according to step 44, the mechanic is instructed to release the front brake lever and, according to step 46, the mechanic is then asked whether or not the front brake lever collapsed to the handlebar grip to which the front brake lever is adjacent. In other words, step 46 is one instance within the method described herein where input is requested from the mechanic through the diagnostic tool and steps 42 and 44 are two instances where, through the diagnostic tool, the mechanic is instructed concerning how to carry out a diagnostic test.

When the front brake lever does completely collapse, an error message is displayed according to step 48. Also according to step 48, instructions are provided for resolving the issue. Pursuant to step 48, or if the front brake lever does not collapse during step 46, the mechanic is informed of the next procedure to be performed according to step 50.

According to step 52, the pump and solenoid are electronically activated. Then, the mechanic is instructed to pump the front brake lever according to step 54. Next, according to step 56, the mechanic is asked whether pulsations were felt in the brake lever while it was being pumped during step 56. If no pulsations were felt, then an error message is displayed and instructions are provided to the mechanic for resolving the issue.

If pulsations were felt into the brake lever while it was being pumped, or if the issue was resolved during step 58, then the mechanic is instructed to perform another manual hydraulic front brake bleed according to step 60. Next, the mechanic is asked whether the front brake lever is firm, as specified in step 62. If the front brake lever is not confirmed, then step 64 specifies that the mechanic be instructed to perform another front ABS unit bleed.

Once the other front ABS unit bleed has been successfully performed, the mechanic is asked whether he or she wishes to perform another front ABS unit bleed, as specified in step 66. The mechanic is also asked this question if the front brake lever was found to be firm during step 62. When the mechanic does wish to perform another bleed, instructions are provided for performing the other front ABS unit bleed according to step 68.

If the mechanic does not wish to perform another front ABS unit bleed, or pursuant to another front ABS unit bleed being performed, step 70 is implemented. According to step 70, the mechanic is asked whether he or she wishes to perform the setup and bleed procedure on a rear system. If such a setup and bleed procedure is desired, then step 72 specifies repeating the above procedure (i.e., steps 40 through 68) for the rear system. On the other hand, if the mechanic does not wish to perform a setup and bleed procedure on the rear system then the module default settings are reset as specified in step 74. This re-setting of the settings once again allows system functionality. In other words, all of the components of the motorcycle once again become functional and the motorcycle may be safely operated.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of diagnosing an anti-lock braking system (ABS) unit, the method comprising:
   connecting a diagnostic tool to an ABS unit of a vehicle;
   communicating with the ABS unit using the diagnostic tool;
   informing a mechanic utilizing the diagnostic tool about a component in the ABS unit; and
   preventing the ABS unit from operating when a diagnostic test carried out using the diagnostic tool is interrupted.

2. The method of claim 1, further comprising:
   instructing the mechanic concerning how to carry out the diagnostic test with the diagnostic tool.

3. The method of claim 2, wherein the instructing step further comprises:
   requesting the mechanic to check for at least one of the following, an incorrect calibration in the ABS unit, a fluid leak, a defective pump, a reversed line and a defective valve.

4. The method of claim 2, wherein the instructing step further comprises:
   instructing the mechanic concerning how to conduct a bleeding procedure.

5. The method of claim 1, further comprising:
   requesting input from the mechanic through the diagnostic tool.

6. The method of claim 5, wherein the requesting step comprises:
   requesting the mechanic to identify a portion of the ABS unit the mechanic wishes to diagnose.

7. The method of claim 6, further comprising:
   asking whether the mechanic wishes to re-diagnose the portion.

8. The method of claim 6, further comprising:
   asking whether the mechanic wishes to diagnose another portion of the ABS unit.

9. The method of claim 5, wherein the requesting step further comprises:
   requesting the mechanic to input information into the diagnostic tool concerning whether a brake lever collapsed pursuant to release thereof.

10. The method of claim 5, wherein the requesting step further comprises:
    requesting the mechanic to pump a brake lever and to subsequently input into the diagnostic tool whether a pulsation occurred as a result thereof.

11. The method of claim 1, wherein the communicating step further comprises:
    verifying that a proper component is included in the ABS unit.

12. The method of claim 11, wherein the verifying step further comprises:
    comparing the proper component against a vehicle identification number (VIN) for compatibility.

13. The method of claim 1, wherein the communicating step further comprises:
    verifying that a component included in the ABS unit is properly aligned.

14. The method of claim 1, further comprising:
    enabling the ABS unit to function pursuant to the diagnostic test having been successfully completed.

15. A diagnostic tool, comprising:
    an interface configured to be connected to an anti-lock braking system (ABS) unit of a vehicle;
    circuitry connected to the interface and configured to diagnose the ABS unit; and
    a user interface connected to the circuitry and configured to inform a user about a component in the ABS unit, wherein the circuitry is configured to prevent the ABS unit from operating when a diagnostic test carried out using the diagnostic tool is interrupted.

16. The diagnostic tool of claim 15, wherein the user interface is further configured to instruct the user concerning how to carry out the diagnostic test.

17. The diagnostic tool of claim 15, wherein the user interface is further configured to request feedback from the user.

18. A diagnostic tool, comprising:
an interface configured to be connected to an anti-lock braking system (ABS) unit of a vehicle;
circuitry connected to the interface and configured to diagnose the ABS unit; and
a user interface connected to the circuitry and configured to inform a user about a component in the ABS unit, wherein the circuitry is configured to prevent the ABS unit from operating when a diagnostic test carried out using the diagnostic tool fails.

19. A diagnostic tool, comprising:
means for connecting the diagnostic tool to an anti-lock braking system (ABS) unit of a vehicle;
means for communicating with the ABS unit using the diagnostic tool;
means for informing a mechanic utilizing the diagnostic tool about a component in the ABS unit; and
means for processing configured to prevent the ABS unit from operating when a diagnostic test carried out using the diagnostic tool is interrupted.

* * * * *